US011528682B2

(12) United States Patent
Tang (10) Patent No.: US 11,528,682 B2
(45) Date of Patent: Dec. 13, 2022

(54) METHOD FOR PAGING USER EQUIPMENT, FIRST NETWORK DEVICE, AND USER EQUIPMENT (71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/894,050

(22) Filed: Jun. 5, 2020

(65) Prior Publication Data
US 2020/0305117 A1 Sep. 24, 2020

Related U.S. Application Data (63) Continuation of application No. PCT/CN2017/116590, filed on Dec. 15, 2017.

(51) Int. Cl.
*H04W 68/00* (2009.01)
*H04W 76/10* (2018.01)
(52) U.S. Cl.
CPC .......... *H04W 68/00* (2013.01); *H04W 76/10* (2018.02)
(58) Field of Classification Search
CPC ..... H04W 68/00; H04W 76/00; H04W 76/10; H04W 76/15; H04W 76/19; H04W 76/27
See application file for complete search history.

(56) References Cited

U.S. PATENT DOCUMENTS

| 10,841,847 | B2 * | 11/2020 | Kim ..................... H04W 36/08 |
| 11,140,740 | B2 * | 10/2021 | Martinez Tarradell ..................... H04W 76/27 |
| 11,190,966 | B2 * | 11/2021 | Tang ................. H04W 28/0263 |
| 2017/0150545 | A1 | 5/2017 | Ramkumar et al. |
| 2018/0270895 | A1 * | 9/2018 | Park ........................ H04W 8/18 |

(Continued)

FOREIGN PATENT DOCUMENTS

| CN | 103687008 A | 3/2014 |
| CN | 104349312 A | 2/2015 |

(Continued)

OTHER PUBLICATIONS

International Search Report for PCT/CN2017/116590 dated Aug. 21, 2018.
(Continued)

*Primary Examiner* — Lester G Kincaid
*Assistant Examiner* — Dung L Lam
(74) *Attorney, Agent, or Firm* — Young Basile Hanlon & MacFarlane, P.C.

(57) ABSTRACT

Disclosed in the present disclosure are a method for paging user equipment (UE), a first network device, a UE, and a computer storage medium. The method comprises: when a first network device or a second network device receives a data packet sent from a core network, initiating an initial RAN paging within a first paging area corresponding to the first network device; and indicating in the RAN initial paging that the identifier used by the UE when performing an RRC recovery request is a UE context identifier assigned by the first network device or a UE context identifier assigned by the second network device.

13 Claims, 2 Drawing Sheets (56) References Cited

U.S. PATENT DOCUMENTS

| | | | | |
|---|---|---|---|---|
| 2019/0223152 A1* | 7/2019 | Ke | ......................... | H04W 68/00 |
| 2020/0178208 A1* | 6/2020 | Kim | ....................... | H04W 76/15 |
| 2021/0084705 A1* | 3/2021 | Wang | .................... | H04W 76/15 |

FOREIGN PATENT DOCUMENTS

| | | | | | |
|---|---|---|---|---|---|
| CN | 106102105 | A | | 11/2016 | |
| CN | 107371215 | A | | 11/2017 | |
| CN | 107995688 | B | * | 6/2021 | ............ H04W 76/27 |
| EP | 2519066 | A1 | | 10/2012 | |

OTHER PUBLICATIONS

3GPP TR 23.723 V0.2.0 (Jun. 2017); 3rd Generation Partnership Project; Technical Specification Group Services and System Aspects; Study of system level impacts due to introduction of light connection for LTE in EPS (Release 15).

SA WG2 Meeting #S2-122BIS S2-176115; Aug. 21-25, 2017, Sophia Antipolis, France.

3GPP TSG-RAN WG3 Meeting #94 R3-162937 Reno, USA, Nov. 14-18, 2016.

3GPP TSG-RAN WG2 #99bis; Prague, Czech Republic, Oct. 9-13, 2017; R2-1711665.

Extended European Search Report for EP Application 17934407.2 dated Nov. 27, 2020.

3GPP TS 38.300 V15.0.0 (Dec. 2017); 3rd Generation Partnership Project; Technical Specification Group Radio Access Network; NR; NR and NG-RAN Overall Description; Stage 2 (Release 15).

3GPP TS 37.340 V15.0.0 (Dec. 2017); 3rd Generation Partnership Project; Technical Specification Group Radio Access Network; Evolved Universal Terrestrial Radio Access (E-UTRA) and NR; Multi-Connectivity; Stage 2 (Release 15).

Korean Notification of Reason for Refusal with English Translation for KR Application 1020207019285 dated Sep. 1, 2021. (11 pages).

Communication pursuant to Article 94(3) EPC for EP Application 17934407.2 dated Mar. 24, 2022. (5 pages).

* cited by examiner

METHOD FOR PAGING USER EQUIPMENT, FIRST NETWORK DEVICE, AND USER EQUIPMENT

CROSS-REFERENCE TO RELATED APPLICATION(S)

This application is a continuation application of International Application No. PCT/CN2017/116590, filed on Dec. 15, 2017, the entire disclosure of which is hereby incorporated by reference.

TECHNICAL FIELD

The present disclosure relates to a technical field of communication processing, in particular to a method for paging a user equipment (UE), a first network device, a user equipment (UE) and a computer storage medium.

BACKGROUND

The main application scenarios of 5G are: enhanced mobile broadband (eMBB), ultra-reliable and low latency communication (URLLC), and massive machine type communication (mMTC). In a 5G network environment, a new RRC state, that is, RRC_INACTIVE (Radio Resource Control-Inactive) state, is defined for a purpose of reducing air interface signaling, fast recovery of wireless connection and fast recovery of data service. This state is different from a radio resource control-idle state (RRC_IDLE) and a radio resource control-active (RRC_ACTIVE). When a UE is in the RRC_INACTIVE state, a network side will configure the UE with a Radio Access Network (RAN) paging area through a dedicated signaling, and the RAN paging area may be one cell or multiple cells.

At present, the INACTIVE state is not supported in a dual-connection (DC) mode, and a recovery from the INACTIVE state or a suspend state to the DC mode is not supported either, so for a split bearer of a secondary cell group (SCG) and a SCG bearer, a bearer will be lost when the INACTIVE state or the suspended state is recovered. Therefore, a DC configuration mode will not be able to obtain the benefits of INACTIVE, such as a fast connection recovery, a low delay data transmission and a low signaling load.

SUMMARY

In order to solve the above technical problems, implementations of the present disclosure provides a method for paging a user equipment (UE), a first network device, a user equipment (UE) and a computer storage medium.

A method for paging a user equipment (UE) provided by an implementation of the present disclosure, which is applied to a first network device, including:

initiating a RAN initial paging in a first paging area corresponding to a first network device when the first network device or a second network device receives a data packet sent from a core network, and in the RAN initial paging, indicating an identification used by a UE when performing a RRC recovery request to be a UE context identification assigned by the first network device or a UE context identification assigned by the second network device.

An implementation of the present disclosure provides a method for paging UE, which is applied to the UE, including:

receiving a RAN initial paging in a first paging area corresponding to a first network device or in a second paging area corresponding to a second network device; and acquiring, from the RAN initial paging, an identification indicated by a network side and used by a UE when performing a RRC recovery request, to be a UE context identification assigned by the first network device or a UE context identification assigned by the second network device.

An implementation of the present disclosure provides a network device, including:

a first processing unit, configured to initiate a RAN initial paging in a first paging area corresponding to a first network device when the first network device or a second network device receives a data packet sent from a core network, and in the RAN initial paging, indicate an identification used by a UE when performing a RRC recovery request to be a UE context identification assigned by the first network device or a UE context identification assigned by the second network device; and a first communication unit, configured to initiate the RAN initial paging.

An implementation of the present disclosure provides a UE, including:

a second communication unit, configured to receive a RAN initial paging in a first paging area corresponding to a first network device or in a second paging area corresponding to a second network device; and a second processing unit, configured to acquire, from the RAN initial paging, an identification indicated by a network side and used by a UE when performing a RRC recovery request, to be a UE context identification assigned by the first network device or a UE context identification assigned by a second network device.

A first network device provided by an implementation of the present disclosure, including: a processor and a memory for storing a computer program that is executable on the processor.

The processor is used for executing the computer program to perform acts of the above method.

A UE provided by an implementation of the present disclosure, including: a processor and a memory for storing a computer program that is executable on the processor.

The processor is used for executing the computer program to perform acts of the above method.

An implementation of the present disclosure provides a computer storage medium, wherein the computer storage medium stores computer-executable instructions that, when executed, implement acts of the aforementioned method.

According to a technical solution of implementations of the present disclosure, the first network device and the second network device in a dual connection mode may independently trigger paging based on different two paging areas and two UE context identifications configured for the UE, and indicates the UE, in the paging message, that a UE initiating RRC connection recovery uses the UE context identification configured for UE by which network device.

DETAILED DESCRIPTION

To understand features and technical contents of implementations of the present disclosure in more details, the implementation of the implementations of the present disclosure will be described in detail below with reference to the drawings, which are used for reference only and are not intended to limit the implementations of the present disclosure.

Implementation One

An implementation of the invention provides a method for paging a user equipment (UE), which is applied to a first network device, including: initiating a RAN initial paging in a first paging area corresponding to the first network device when the first network device or a second network device receives a data packet sent by a core network, and indicating an identification used by a UE, when performing a RRC recovery request, in the RAN initial paging to be a UE context identification assigned by the first network device or a UE context identification assigned by the second network device.

The first network device and the second network device may be a network device in a dual connection mode.

Figure 1:
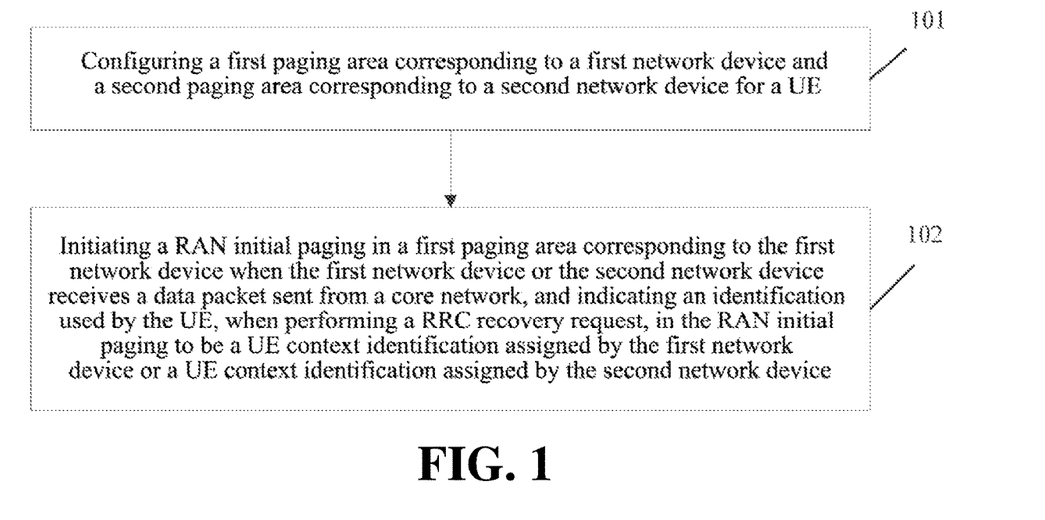
FIG. 1 is a flowchart 1 of a method for paging a user equipment according to an implementation of the present disclosure.

The foregoing solution is described for how a network side initiates a paging to the UE, wherein the first paging area and the second paging area need to be processed before the foregoing solution is executed. Specifically, a processing flow of this implementation is formed by combining the foregoing solution, referring to FIG. 1, including acts 101-102:

act 101: configuring the UE with the first paging area corresponding to the first network device and the second paging area corresponding to the second network device;

act 102: initiating the RAN initial paging in the first paging area corresponding to the first network device when the first network device or the second network device receives the data packet sent from the core network, and indicating the identification used by the UE, when performing the RRC recovery request, in the RAN initial paging to be the UE context identification assigned by the first network device or the UE context identification assigned by the second network device.

Next, referring to FIG. 1, a configuration and paging process will be described respectively. Firstly, how to perform a pre-configuration will be described.

Before the first paging area corresponding to the first network device and the second paging area corresponding to the second network device are executed, the method further includes:

acquiring the second paging area configured by the second network device.

The first network device and the second network device may be a master node (MN) and a secondary node (SN), respectively; wherein, the first network device may be understood as the MN and the second network device may be understood as the SN.

In other words, firstly, the configuration of the RAN paging area is jointly determined by the MN and the SN (i.e., the first network device and the second network device). When the MN and SN negotiate to determine releasing the UE to an INACTIVE state, the SN (i.e., the second network device) sends determined RAN second paging area configuration information to the MN (i.e., the first network device). That is, during configuration, the first network device configures its own first paging area in advance, and the second network device also configures its own second paging area; then the second network device sends the second paging area configured by itself to the first network device; the first network device further configures both the first paging area and the second paging area for the user equipment (UE).

Before the aforementioned act 102 is performed, the method may further include: the first network device configures the UE context identification assigned by the first network device and the UE context identification assigned by the second network device for the UE; in other words, both the MN and the SN configure the UE with context ID information corresponding to the UE, and MN configures UE context IDs corresponding to MN and SN which have been respectively configured by MN and SN for UE. Then, the MN configures the RAN paging area determined by the MN and the paging area determined by the SN for the UE.

When the act 102 is executed, it may be triggered by one of the first network device and the second network device receiving the data packet of the core network CN in advance.

Whether the first network device or the second network device receives the data packet of the CN, it triggers the other network device to perform the RAN initial paging and notifies the other network device of data radio bearer (DRB) identification (ID) information of received data. In other words, when the MN or SN receives the data packet from the CN, the MN or SN triggers each other to initiate the initial RAN paging via Xn or X2, and notifies each other of the DRB ID information of the received data.

Separately:

when the first network device receives the data packet sent from the core network, it triggers the second network device to initiate the RAN initial paging in a corresponding second paging area, notifying the second network device of DRB identification (ID) information corresponding to the received data packet;

or, when the second network device receives the data packet sent by the core network, based on a triggering of the second network device, the RAN initial paging is initiated in the first paging area corresponding to the first network device, and the DRB identification ID information corresponding to the received data packet sent by the second network device is received.

In other words, the MN initiates a RAN initial paging message in the paging area configured by the MN and the SN initiates a RAN initial paging message in the paging area configured by the SN. Meanwhile, the MN and SN indicate the UE in the paging message to use the UE the context identification configured by the MN or SN in the RRC recovery request message.

Specifically, there may be the following two manners.

Manner 1: When a RAN node in the paging area has an X2/Xn connection with one of the first network device and the second network device, the UE context identification, used by the UE in the RRC recovery request, in the RAN initial paging is indicated as the UE context identification assigned by the network device which has the X2/Xn connection with the RAN node in the paging area.

In other words, in the future, it is possible that the RAN node in the RAN paging area may not necessarily have the X2/Xn connection, then a node that UE initiates a RRC connection will initiate a RRC recovery to the MN or SN which has a connection with the node, ensuring that the upper context may be acquired.

Manner 2

When the RAN node in the paging area has an X2/Xn connection with both the first network device and the second network device, based on the data packet of the core network being sent to one of the first network device or the second network device, the UE context identification used by the UE when performing the RRC recovery request is determined in the RAN initial paging.

In other words, a node that the UE initiates the RRC connection recovery has connections with both the MN and the SN, then the RRC connection recovery will be initiated to the MN or the SN which has data from the CN, to avoid data forwarding.

In short, a network side adds an appropriate indication to the paging message according to an actual situation.

It may be seen that by adopting the above solution, the first network device and the second network device in a dual connection mode may independently trigger paging based on different two paging areas and two UE context identifications configured for the UE, and indicates the UE, in the paging message, that a UE initiating RRC connection recovery uses the UE context identification configured for UE by which network device. Therefore, data forwarding is avoided, and UE context information is also avoided from being acquired through CN, and an inactive state in DC mode may also be supported.

Implementation Two

Figure 2:
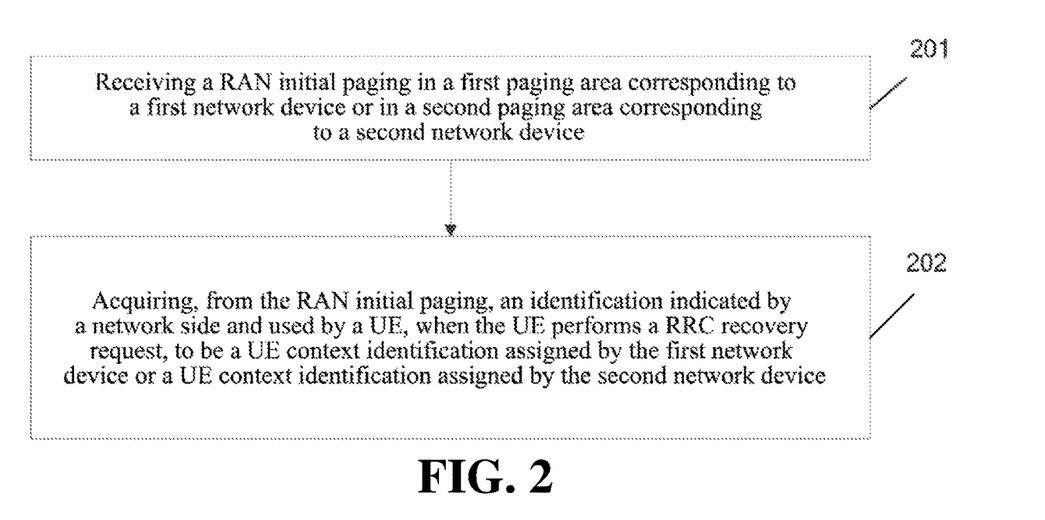
FIG. 2 is a flowchart 2 of a method for paging a user equipment according an implementation of the present disclosure.

An implementation of the present disclosure provides a method for paging a user equipment (UE), which is applied to the UE, as shown in FIG. 2, the method includes acts 201-202:

act 201: receiving a RAN initial paging in a first paging area corresponding to a first network device or in a second paging area corresponding to a second network device;

act 202: acquiring, from the RAN initial paging, an identification indicated by a network side and used by a UE, when performing a RRC recovery request, to be a UE context identification assigned by the first network device or a UE context identification assigned by a second network device.

The first network device and the second network device may be a network device in a dual connection mode.

The following is a description of a configuration and a paging process respectively. Firstly, how to perform a pre-configuration will be described:

Before the RAN initial paging is received in the first paging area corresponding to the first network device or in the second paging area corresponding to the second network device, the method further includes:

receiving the first paging area corresponding to the first network device and the second paging area corresponding to the second network device configured by the first network device for the UE.

The above-mentioned first network device and second network device may be a master node (MN) and a secondary node (SN), respectively; wherein, the first network device may be understood as the MN and the second network device may be understood as the SN.

In other words, firstly, the configuration of the RAN paging area is jointly determined by the MN and SN (i.e., the first network device and the second network device). When the MN and SN negotiate to determine releasing the UE to the INACTIVE state, the SN (i.e., the second network device) sends determined configuration information of the RAN second paging area to the MN (i.e., the first network device). That is, during the configuration, the first network device configures its own first paging area in advance, and the second network device also configures its own second paging area; then the second network device sends the second paging area configured by itself to the first network device; the first network device configures both the first paging area and the second paging area for the user equipment (UE).

The method may further include: acquiring the UE context identification assigned by the first network device and the UE context identification assigned by the second network device configured by the first network device for the UE; in other words, both the MN and the SN configure the UE with the context ID information corresponding to the UE, and MN configures UE context IDs corresponding to MN and SN which have been respectively configured by MN and SN for UE. Then, the MN configures the RAN paging area determined by the MN and the paging area determined by the SN to the UE.

The RAN initial paging may be triggered by one of the first network device and the second network device which receives the data packet of the core network (CN) in advance. According to the UE context identification information also included in the RAN initial paging, the RRC recovery connection processing is initiated to the network side by adopting the corresponding UE context identification in the RAN initial paging.

Specifically, there may be the following two manners.

Manner 1: When a RAN node in the paging area has an X2/Xn connection with one of the first network device and the second network device, the UE context identification used by the UE, when performing a RRC recovery request, in the RAN initial paging is indicated as the UE context identification assigned by the network device which has the X2/Xn connection with the RAN node in the paging area.

In other words, in the future, it is possible that the RAN node in the RAN paging area may not necessarily have the X2/Xn connection, then a node that UE initiates a RRC connection will initiate a RRC recovery to the MN or SN which has a connection with the node, ensuring that the upper context may be acquired.

Manner 2

When the RAN node in the paging area has an X2/Xn connection with both the first network device and the second network device, based on the data packet of the core network being sent to one of the first network device or the second network device, the UE context identification used by the UE when performing the RRC recovery request is determined and indicated in the RAN initial paging.

In other words, a node that the UE initiates the RRC connection recovery has connections with both the MN and the SN, then the RRC connection recovery will be initiated to the MN or the SN which has data from the CN, to avoid data forwarding.

Correspondingly, the UE receives a paging and according to an indication in the paging, an appropriate resume id (i.e. UE context identification) is used to initiate an RRC recovery process to recover the RRC connection.

It may be seen that by adopting the above solution, the first network device and the second network device in a dual connection mode may independently trigger paging based on different two paging areas and two UE context identifications configured for the UE, and indicates the UE, in the paging message, that a UE initiating RRC connection recovery uses the UE context identification configured for UE by which network device. Therefore, data forwarding is avoided, and UE context information is also avoided from being acquired through CN, and an inactive state in DC mode may also be supported.

Implementation Three

Figure 3:
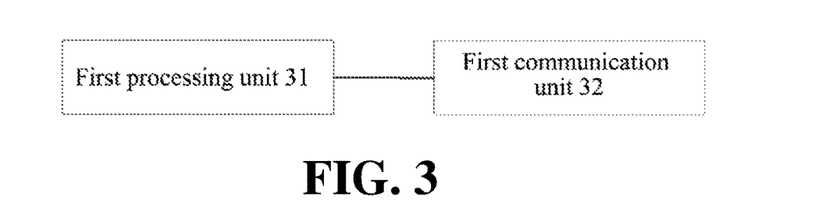
FIG. 3 is a schematic diagram of structure of a network device according to an implementation of the present disclosure.

An implementation of the present disclosure provides a network device. As shown in FIG. 3, the network device includes a first processing unit 31 and a first communication unit 32.

The first processing unit 31 is configured to initiate a RAN initial paging in a first paging area corresponding to a first network device when the first network device or a second network device receives a data packet sent from a core network, and indicate, in the RAN initial paging, an identification used by a UE when performing a RRC recovery request to be a UE context identification assigned by the first network device or a UE context identification assigned by the second network device; and the first communication unit 32 is configured to initiate the RAN initial paging.

The first network device and the second network device may be a network device in a dual connection mode.

The foregoing solution describes how a network side initiates a paging to the UE, wherein the first paging area and the second paging area need to be processed before the foregoing solution is executed, includes:

the first communication unit 32, configured to configure, for the UE, the first paging area corresponding to the first network device and the second paging area corresponding to the second network device;

the first processing unit 31, configured to initiate the RAN initial paging in the first paging area corresponding to the first network device through the first communication unit 32 when the first network device or the second network device receives the data packet sent from the core network, and indicate, in the RAN initial paging, the identification used by the UE when performing the RRC recovery request to be the UE context identification assigned by the first network device or the UE context identification assigned the second network device.

Next, referring to FIG. 1, a configuration and paging process will be described respectively. Firstly, how to perform a pre-configuration will be described.

Before executing the first paging area corresponding to the first network device and the second paging area corresponding to the second network device, the first processing unit 31 is configured to acquire the second paging area configured by the second network device.

The first network device and the second network device may be a master node (MN) and a secondary node (SN), respectively; wherein, the first network device may be understood as the MN and the second network device may be understood as the SN.

In other words, firstly, the configuration of the RAN paging area is jointly determined by the MN and the SN (i.e., the first network device and the second network device). When the MN and SN negotiate to determine releasing the UE to the INACTIVE state, the SN (i.e., the second network device) sends determined RAN second paging area configuration information to the MN (i.e., the first network device). That is, during configuration, the first network device configures its own first paging area in advance, and the second network device also configures its own second paging area; then the second network device sends the second paging area configured by itself to the first network device; the first network device further configures both the first paging area and the second paging area for the user equipment (UE).

The first communication unit is configured to: configure the UE context identification assigned by the first network device and the UE context identification assigned by the second network device for the UE. In other words, both the MN and the SN configure the UE with context ID information corresponding to the UE, and MN configures UE context IDs corresponding to MN and SN which have been respectively configured by MN and SN for UE. Then, the MN configures the RAN paging area determined by the MN and the paging area determined by the SN to the UE.

The RAN initial paging may be triggered when one of the network device in the first network device and the second network device receives the data packet of the core network CN in advance.

Whether the first network device or the second network device receives the data packet of the CN, it triggers the other network device to perform the RAN initial paging and notifies the another network device data radio bearer (DRB) identification (ID) information of received data. In other words, when the MN or SN receives the data packet from the CN, the MN or SN triggers each other to initiate the initial RAN paging via Xn or X2, and notifies each other of the DRB ID information of the received data.

Separately:

the first processing unit is configured to trigger the second network device to initiate the RAN initial paging in a corresponding second paging area when the first network device receives the data packet sent from the core network, and notify the second network device of DRB identification (ID) information corresponding to the received data packet;

or, the first processing unit is configured to initiate the RAN initial paging in the first paging area corresponding to the first network device based on a triggering of the second network device when the second network device receives the data packet sent by the core network, and receive the DRB identification (ID) information corresponding to the received data packet sent by the second network device.

In other words, the MN initiates a RAN initial paging message in the paging area configured by the MN and the SN initiates a RAN initial paging message in the paging area configured by the SN. Meanwhile, the MN and SN indicate the UE in the paging message to use the UE the context identification configured by the MN or SN in the RRC recovery request message.

Specifically, there may be the following two manners.

Manner 1: When a RAN node in the paging area has an X2/Xn connection with one of the first network device or the second network device, in the RAN initial paging, the UE context identification used by the UE when performing the RRC recovery request is indicated as the UE context identification assigned by the network device which has the X2/Xn connection with the RAN node in the paging area.

In other words, in the future, it is possible that the RAN node in the RAN paging area may not necessarily have the X2/Xn connection, then a node that UE initiates a RRC connection will initiate a RRC recovery to the MN or SN which has a connection with the node, ensuring that the upper context may be acquired.

Manner 2

When the RAN node in the paging area has an X2/Xn connection with both the first network device and the second network device, based on the data packet of the core network being sent to one of the first network device or the second network device, the UE context identification used by the UE when performing the RRC recovery request is indicated and determined in the RAN initial paging.

In other words, a node that the UE initiates the RRC connection recovery has connections with both the MN and the SN, then the RRC connection recovery will be initiated to the MN or the SN which has data from the CN, to avoid data forwarding.

In short, a network side adds an appropriate indication to the paging message according to an actual situation.

It may be seen that by adopting the above solution, the first network device and the second network device in a dual connection mode may independently trigger paging based on different two paging areas and two UE context identifications configured for the UE, and indicates the UE, in the paging message, that a UE initiating RRC connection recovery uses the UE context identification configured for UE by which network device. Therefore, data forwarding is avoided, and UE context information is also avoided from being acquired through CN, and an inactive state in DC mode may also be supported.

Implementation Four

Figure 4:
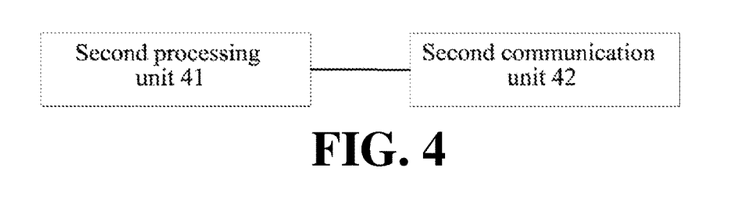
FIG. 4 is a schematic diagram of structure of a user equipment according to an implementation of the present disclosure.

An implementation of the present disclosure provides a UE, as shown in FIG. 4, including a second communication unit 41 and a second processing unit 42.

The second communication unit 41 is configured to receive a RAN initial paging in a first paging area corresponding to a first network device or in a second paging area corresponding to a second network device.

The second processing unit 42 is configured to acquire, from the RAN initial paging, an identification indicated by a network side and used by a UE when performing a RRC recovery request, to be a UE context identification assigned by the first network device or a UE context identification assigned by a second network device.

The first network device and the second network device may be a network device in a dual connection mode.

The following is a description of a configuration and a paging process respectively. Firstly, how to perform a pre-configuration will be described:

before the RAN initial paging is received in the first paging area corresponding to the first network device or in the second paging area corresponding to the second network device, the second communication unit is configured to: receive the first paging area corresponding to the first network device and the second paging area corresponding to the second network device configured by the first network device for the UE.

The above-mentioned first network device and second network device may be a master node (MN) and a secondary node (SN), respectively; wherein, the first network device may be understood as the MN and the second network device may be understood as the SN.

In other words, firstly, the configuration of the RAN paging area is jointly determined by the MN and SN (i.e., the first network device and the second network device). When the MN and SN negotiate to determine releasing the UE to the INACTIVE state, the SN (i.e., the second network device) sends determined configuration information of the RAN second paging area to the MN (i.e., the first network device). That is, during the configuration, the first network device configures its own first paging area in advance, and the second network device also configures its own second paging area; then the second network device sends the second paging area configured by itself to the first network device; the first network device configures both the first paging area and the second paging area for the user equipment (UE).

The second communication unit is configured to acquire the UE context identification assigned by the first network device and the UE context identification assigned by the second network device configured by the first network device to the UE. In other words, both the MN and the SN configure the UE with the context ID information corresponding to the UE, and MN configures UE context IDs corresponding to MN and SN which have been respectively configured by MN and SN for UE. Then, the MN configures the RAN paging area determined by the MN and the paging area determined by the SN to the UE.

The RAN initial paging may be triggered by one of the network device in the first network device and the second network device which receives the data packet of the core network (CN) in advance. According to the UE context identification information also included in the RAN initial paging, the RRC recovery connection processing is initiated to the network side by adopting the corresponding UE context identification in the RAN initial paging.

Specifically, there may be the following two manners.

Manner 1: When a RAN node in the paging area has an X2/Xn connection with one of the first network device or the second network device, in the RAN initial paging, the UE context identification used by the UE when performing an RRC recovery request is indicated as the UE context identification assigned by the network device which has the X2/Xn connection with the RAN node in the paging area.

In other words, in the future, it is possible that the RAN node in the RAN paging area may not necessarily have the X2/Xn connection, then a node that UE initiates a RRC connection will initiate a RRC recovery to the MN or SN which has a connection with the node, ensuring that the upper context may be acquired.

Manner 2

When the RAN node in the paging area has an X2/Xn connection with both the first network device and the second network device, based on the data packet of the core network being sent to one of the first network device or the second network device, the UE context identification used by the UE when performing the RRC recovery request is indicated and determined in the RAN initial paging.

In other words, a node that the UE initiates the RRC connection recovery has connections with both the MN and the SN, then the RRC connection recovery will be initiated to the MN or the SN which has data from the CN to avoid data forwarding.

Correspondingly, the UE receives a paging, and the second processing unit is configured to, according to an indication in the paging, use an appropriate resume id (i.e. UE context identification) to initiate an RRC recovery process to recover the RRC connection.

It may be seen that by adopting the above solution, the first network device and the second network device in a dual connection mode may independently trigger paging based on different two paging areas and two UE context identifications configured for the UE, and indicates the UE that a UE initiating RRC connection recovery uses the UE context identification configured for UE by which network device in the paging message. Therefore, data forwarding is avoided, UE context information is also avoided from being acquired through CN, and an inactive state in DC mode may also be supported.

Figure 5:
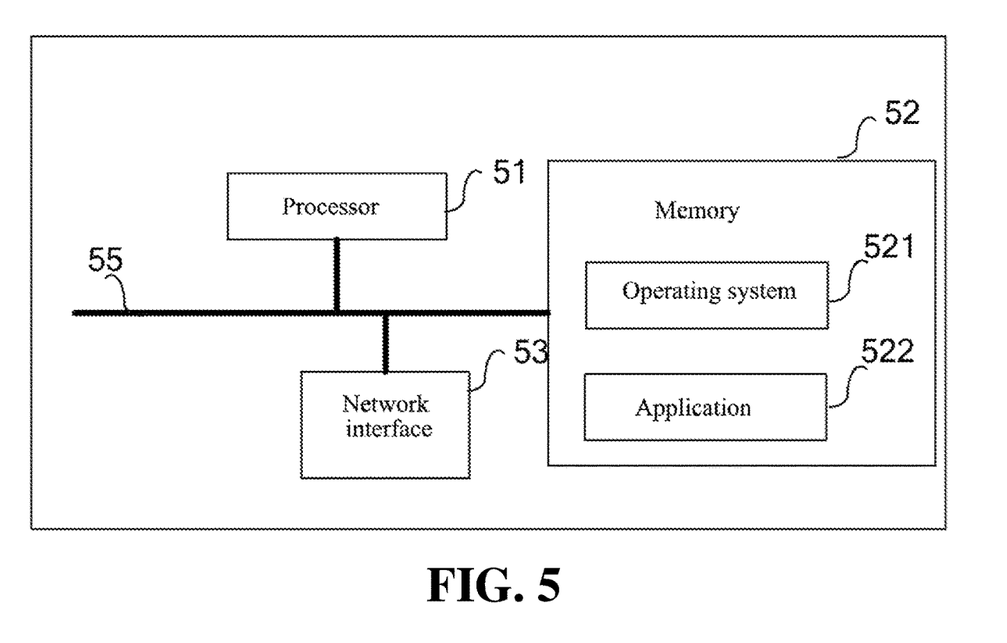
FIG. 5 is a schematic diagram of architecture of hardware according to an implementation of the present disclosure.

An implementation of the present disclosure also provides a user equipment, or an architecture of hardware composition of receiving side device. As shown in FIG. 5, which includes at least one processor 51, a memory 52, and at least one network interface 53. The various components are coupled together by a bus system 54. It may be understood that the bus system 54 is used for implementing connection and communication between these components. In addition to a data bus, the bus system 54 includes a power bus, a control bus, and a status signal bus. However, for clarity, all kinds of buses are uniformly referred to as a bus system 54 in the FIG. 5.

It should be understood that the memory 52 in an implementation of the present disclosure may be a transitory memory or a non-transitory memory, or it may include both transitory and non-transitory memory.

In some implementations, the memory 52 stores following elements, executable modules or data structures, or subsets thereof, or extended sets thereof: an operating system 521 and application 522.

The processor 51 is configured to process acts in methods in the first implementation or the second implementation, which will not be described here.

An implementation of the present disclosure provides a computer storage medium storing computer executable instructions, and when the computer executable instructions are executed, the acts in the method of the first or second implementation are implemented.

The above device in the implementations of the present disclosure may also be stored in a computer readable storage medium when it is implemented in the form of a software function module and sold or used as an independent product. Based on this understanding, the technical solutions in the implementations of the present disclosure, in essence, or the part contributing to the prior art, may be embodied in the form of a software product stored in a storage medium, including several instructions for causing a computer device (which may be a personal computer, a server, or a network device, etc.) to perform all or part of the methods described in various implementations of the present disclosure. The aforementioned storage medium includes a U disk, a mobile hard disk, a read-only memory (ROM), a magnetic disk or an optical disk, and other media capable of storing program codes. Thus, the implementations of the present disclosure are not limited to any specific combination of hardware and software.

Correspondingly, an implementation of the present disclosure also provides a computer storage medium in which a computer program is stored, and the computer program is configured to execute the data scheduling method in the implementations of the present disclosure.

Although the preferable implementations of the present disclosure have been disclosed for illustrative purposes, those skilled in the art will recognize that various modifications, additions and substitutions are also possible, and therefore, the scope of the present disclosure should not be limited to the above implementations.

What is claimed is:

1. A method of paging a user equipment (UE), applied to a first network device, comprising:
configuring a first paging area corresponding to the first network device and a second paging area corresponding to a second network device for the UE;
triggering, by the first network device, the second network device to initiate a Radio Access Network (RAN) initial paging in the second paging area when the first network device receives a data packet sent from a core network, and indicating the UE in a paging message to use UE context identification configured by the second network device in a Radio Resource Control (RRC) recovery request message;
triggering, by the second network device, the first network device to initiate a RAN initial paging in the first paging area when the second network device receives the data packet sent by the core network, and indicating the UE in a paging message to use UE context identification configured by the first network device in the RRC recovery request message; and
configuring, by the first network device, the UE context identification assigned by the first network device and the UE context identification assigned by the second network device for the UE.

2. The method of claim 1, further comprising:
notifying the second network device of data radio bearer (DRB) identification (ID) information corresponding to the received data packet.

3. The method of claim 1, wherein triggering, by the second network device, to initiate the RAN initial paging in the first paging area when the second network device receives the data packet sent by the core network comprises:
receiving a DRB identification (ID) information corresponding to the received data packet sent by the second network device.

4. The method of claim 1, wherein indicating the identification used by the UE, when performing a RRC recovery request, in the RAN initial paging to be the UE context identification assigned by the first network device or the UE context identification assigned by the second network device, comprises:
when a RAN node in a paging area has an X2/Xn connection with one of the first network device and the second network device, indicating the UE context identification used by the UE, when performing the RRC recovery request, in the RAN initial paging as the UE context identification assigned by the network device which has the X2/Xn connection with the RAN node in the paging area.

5. The method of claim 1, wherein indicating the identification used by the UE, when performing a RRC recovery request, in the RAN initial paging to be the UE context identification assigned by the first network device or the UE context identification assigned by the second network device, comprises:
when a RAN node in a paging area has an X2/Xn connection with both the first network device and the second network device, based on the data packet of the core network being sent to one of the first network device and the second network device, determining the UE context identification used by the UE, when performing the RRC recovery request, in the RAN initial paging.

6. The method of claim 1, further comprising:
before configuring the first paging area corresponding to the first network device and the second paging area corresponding to the second network device for the UE, acquiring the second paging area configured by the second network device.

7. A first network device, comprising:
a processor configured to:
configure a first paging area corresponding to the first network device and a second paging area corresponding to a second network device for the UE;
trigger the second network device to initiate a Radio Access Network (RAN) initial paging in the second paging area when the first network device receives a data packet sent from a core network;
indicate a User Equipment (UE) in a paging message to use UE context identification configured by the second network device in a Radio Resource Control (RRC) recovery request message;

initiate a RAN initial paging in the first paging area through a network interface based on triggering of the second network device when the second network device receives the data packet sent by the core network; and indicate the UE in a paging message to use UE context identification configured by the first network device in the RRC recovery request message; and the network interface is configured to:

initiate the RAN initial paging; and configure the UE context identification assigned by the first network device and the UE context identification assigned by the second network device for the UE.

8. The first network device of claim 7, wherein the processor is further configured to:

notify the second network device of data radio bearer (DRB) identification (ID) information corresponding to the received data packet.

9. The first network device of claim 7, wherein the processor is further configured to:

receive DRB identification (ID) information corresponding to the received data packet sent by the second network device.

10. The first network device of claim 7, wherein the processor is further configured to:

when a RAN node in a paging area has an X2/Xn connection with one of the first network device and the second network device, indicate the UE context identification used by the UE, when performing a RRC recovery request, in the RAN initial paging as the UE context identification assigned by the network device which has the X2/Xn connection with the RAN node in the paging area.

11. The first network device of claim 7, wherein the processor is further configured to:

when a RAN node in a paging area has an X2/Xn connection with both the first network device and the second network device, based on the data packet of the core network being sent to one of the first network device and the second network device, determine the UE context identification used by the UE, when performing a RRC recovery request, in the RAN initial paging.

12. The first network device of claim 7, wherein the processor is further configured to:

acquire the second paging area configured by the second network device.

13. A User Equipment (UE), comprising:

a network interface configured to:

receive a Radio Access Network (RAN) initial paging in a first paging area corresponding to a first network device or in a second paging area corresponding to a second network device;

receive the first paging area corresponding to the first network device and the second paging area corresponding to the second network device configured by the first network device for the UE; and acquire a UE context identification assigned by the first network device and a UE context identification assigned by the second network device configured by the first network device for the UE; and a processor configured to:

acquire, from the RAN initial paging, an identification indicated by a network side and used by the UE, when the UE performs a Radio Resource Control (RRC) recovery request, to be the UE context identification assigned by the first network device or the UE context identification assigned by the second network device; and use a corresponding UE context identification in the RAN initial paging to initiate a RRC recovery connection processing to the network side according to UE context identification information included in the RAN initial paging.

* * * * *